July 6, 1926.
A. C. FISCHER
EXPANSION JOINT
Filed Sept. 6, 1921
1,591,670
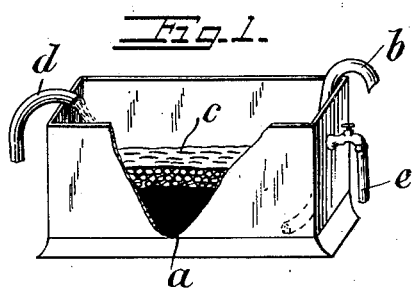
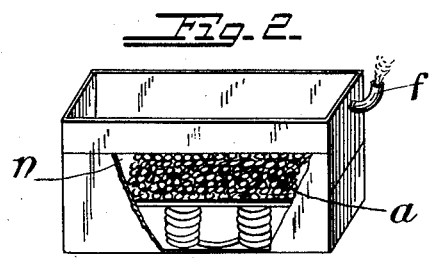
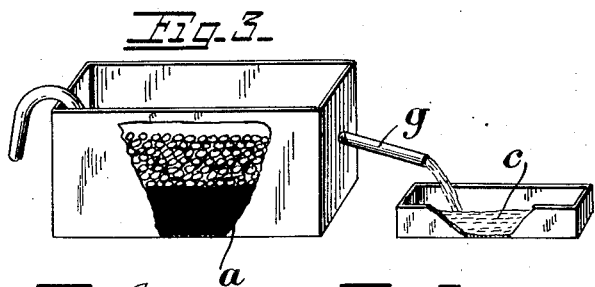
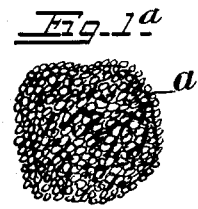
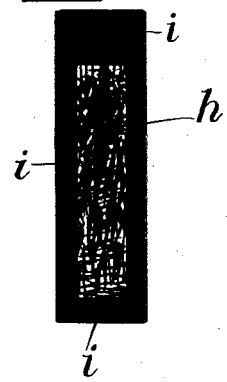
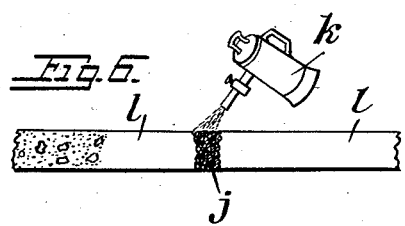
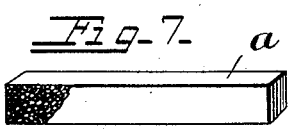
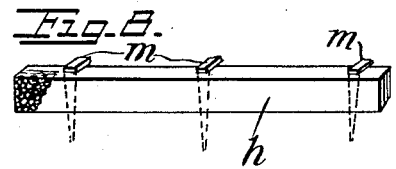
Inventor
Albert C. Fischer
By Willard L. Knight
Atty.

Patented July 6, 1926.

1,591,670

UNITED STATES PATENT OFFICE.

ALBERT C. FISCHER, OF CHICAGO, ILLINOIS.

EXPANSION JOINT.

Application filed September 6, 1921. Serial No. 498,863.

Figures 1, 2, and 3 represent apparatus used in three different methods of producing the material embodying the invention; and Figure 1ª illustrates a mass of such material.

Figures 4 and 5 represent, in transverse section, expansion joint material having a cellular interior and an impervious or solid exterior.

Figure 6 represents a method of providing an impervious or solid skin upon the exposed portion of an expansion joint when in place between two paving blocks.

Figure 7 is a perspective view, partly in section, of an expansion joint member adapted for use in the situation suggested in Figure 6.

Figure 8 illustrates the use of the member shown in Figure 7 as a molding or defining partition against which plastic paving material can be molded; and Figures 9 and 10 show two other applications of the material of the invention.

This invention is in part a division of my application Serial No. 335,170, filed November 1, 1919, and relates to an asphaltic or bituminous, spongelike, cellular structure, the cells remaining mostly in an unbroken state.

The joint may be formed into a cellular spongelike mass under any suitable air trapping conditions. This may be accomplished by directing air thru the heated mass so the bubbles accumulate against a cold surface. By chemical action under pressure, wherein various chemicals are compounded, using bituminous material as the base or bulk, the same cellular structure can be obtained. Bicarbonate of soda, Glauber's salts, sulphur, lime and various chemicals may be used in varying proportions to accomplish the object desired.

A mass of bituminous matter may be mixed with a fibrous substance to strengthen it, suitably filled or charged with air cells, and while in this condition suddenly chilled or immersed in cold water.

Another method by which the air trapping conditions may be effected is to prepare a substance to increase its capillary action, and then immerse the body in heated bituminous matter, and allowing the body to absorb and draw the heated bituminous matter thru its structure, thereby forming a bituminous wall about its numerous air pockets, and creating a spongy cellular mass, readily compressed and of a resilient spongelike character.

It is readily understood that the bituminous substance used may be chemically treated, air blown, fibrated and otherwise treated to secure toughness and rubbery consistency. This would naturally involve many chemicals used in the treatment of rubber, sponge rubber and its preparation for vulcanization—so I do not wish to be limited to the nature, body structure or chemical contents of the asphalt or other bituminous material. Vegetable oils may also enter into such a structure if properly treated, especially for the manufacture of expansion joints. Earthy matter is sometimes used to secure greater stiffness and check the inherent flow tendency and adhesiveness.

This cellular structure differs greatly from that shown in previous inventions, in that the air pockets are closed and sealed.

Where solid bituminous matter has been used under pressure, for instance, the pressure upon it of adjoining paving sections incident to its use as a paving joint, there is an elongation or lengthening of the mass and an oozing out from the packed space, which conclusively shows that the body is not inherently compressible. Likewise with laminated joints where the felt has been saturated and squeezed between rollers, then laid together with a solid asphalt layer there is no inherent compressibility.

Where hemp, rope, and other packing materials are used they are immersed in a light waterproofing material or solidly saturated so no cellular structure exists, as herein described. Under pressure most of the joints ooze out of the crevice and lay over on the pavement, thus preventing the substance reentering the crevice.

By inherently compressible paving joint, I mean one which can be compacted into a lesser space without elongation or displacement of its contained bituminous matter or equivalent waterproofing and air pocketing ingredient. Such a joint is caused to adhere to the faces of the opposing pavement slabs, and its expansion in response to contraction of the slabs is more real and rapid than is possible with a solid or boardlike structure.

Upon motion of the opposing slabs or impact, the cellular nature of the structure causes it to conform itself to the changed conditions, whereas a solid structure is sometimes lifted bodily from the crevice.

One of the advantages of this joint is the fact that metal stakes can be driven through the joints very readily, holding same in place until concrete is poured on either side, then later removed. This obviates the necessity of special forms and side staking. The rigidity is produced by the staking and much labor is saved and movement of the joint prevented after it is once staked in position.

The bituminous cellular material herein described should preferably be of a very stiff and tough structure and contain considerable earthy matter to prevent adhesion of the cell walls. One good medium thru which the air can be trapped in pockets is by utilizing a matted, laminated, cellular flax structure, or one of hemp, flax and straw, which have been treated with caustic soda, thus removing the gummy matter in the straw, flax or other vegetable fibre, thus increasing its capillary action.

My invention is further illustrated by referring to the accompanying drawings in which Figure 1 illustrates a simple method of trapping bituminous air cells. $a$— represents the heated material —$b$— the air tube supplying the air bubbles —$c$— a cold water layer causing a thick over skin against which the cells can form —$d$— water supply for constantly supplying fresh cold water —$e$— water overflow. Figure 1ª illustrates the herein described cellular structure. Figure 2ª illustrates how cells may be formed in toughened bituminous matter under pressure —$a$— representing the bituminous material, —$n$— the casing —$f$— the air vent.

Figure 3 represents the heated material in a bubbling or foaming state, being ejected into a water bath for rapid cooling, —$a$— representing the heated material, —$g$— the outlet pipe, —$c$— the water bath.

Figure 4 represents a cross section of fibrous, matted material having capillary action. After saturation the air pockets are sealed by walls of bituminous matter.

Figure 5 illustrates the fibrous structure shown in Figure 4 after complete saturation and envelopment of the outer surfaces —$i$— sealing the cellular structure —$h$— within.

Figure 6 illustrates a section of sponge asphalt —$j$— being treated with a torch —$k$— to cause an imperforate skin and flow so as to seal the joint in the pavement —$l$—.

Figure 7 illustrates a strip of cellular asphalt for caulking purposes.

Figure 8 illustrates a section of sponge asphalt —$h$— staked with metal pins —$m$— driven thru its cellular structure.

Figure 9 illustrates the herein described sponge asphalt laid adjacent to car rails for both deadening and expansion purposes.

Figure 10 illustrates a sheet of the herein described spongy, bituminous matter, used as a waterproof cushion between the base course and an overlying brick course.

Referring more particularly to Figures 1ª and 4 to 10, $a$ represents a sponge-like cellular body of asphaltic material, procured by one of the methods suggested in Figures 1, 2, and 3, or in some other suitable method. $h$ (Figures 4 and 5) represents a section of packing joint, the body of which consists of the aforesaid cellular material while the outer walls $i$ are composed of solid bituminous matter enveloping the sponge-like cavity; the thickness of the wall being preferably greater at the upper end than elsewhere. This packing joint may be used as suggested in Figure 6, where $e$, $e$, represent two adjoining slabs of concrete paving and $j$ represents a joint formed between them by the material constituting the subject-matter of the present invention. The material may also be in the form $a$ shown in Figure 7, where it is of approximately square section, in which form it will be particularly adapted for use for calking purposes. It may also be used as shown in Figure 8 as a molding wall for concrete pavements by driving spikes $m$ through the joint until the plastic is poured on either side, after which the spikes can be withdrawn and the holes filled up with liquid bituminous material. The bar $a$ of packing material is also adapted for use alongside of railway rails, as suggested at $a$ in Figure 9, and it may also be used in the situation indicated by $a$ in Figure 10, as a waterproofing layer between a foundation beneath it and a course of building material laid above it.

What I wish to claim is:—

1. Bituminous construction material comprising a sponge-like cellular structure, having fibrous material incorporated therewith for reinforcing the cells of said structure.

2. Construction material consisting of bituminous material, the interior portion of which has a sponge-like cellular structure with fibrous material incorporated therein for reinforcing the cells of said structure, and the exterior comprising a solid wall enclosing said interior portion.

3. Construction material consisting of bituminous material, the interior portion of which has a sponge-like structure, and the exterior constitutes a solid wall enclosing said interior portion.

4. Construction material comprising a spongelike cellular body of bituminous matter with solid enveloping walls, and sustaining spikes driven through the same and sustaining it in position to serve as a molding wall.

Signed at Chicago, State of Illinois, this second day of September, 1921.

ALBERT C. FISCHER.